United States Patent [19]

Shah et al.

[11] Patent Number: 4,637,946

[45] Date of Patent: Jan. 20, 1987

[54] ROAD REPAIR MEMBRANE

[75] Inventors: Hasmukh G. Shah; Dwight S. Musgrave, both of Granville, Ohio

[73] Assignee: Owens-Corning Fiberglas Corporation, Toledo, Ohio

[21] Appl. No.: 799,220

[22] Filed: Nov. 18, 1985

[51] Int. Cl.⁴ .................. B32B 3/26; C08L 95/00; E01C 3/06; E01C 11/2

[52] U.S. Cl. ............................... 428/63; 404/72; 404/74; 404/134; 428/253; 428/254; 428/285; 428/334; 428/489; 428/521; 524/68

[58] Field of Search ............. 428/63, 489, 253, 254, 428/334, 285, 521; 404/72, 75, 134; 524/68

[56] References Cited

U.S. PATENT DOCUMENTS

| | | | |
|---|---|---|---|
| 2,892,592 | 6/1959 | Greene et al. | 238/283 |
| 3,253,521 | 5/1966 | Endres | 94/23 |
| 3,265,765 | 8/1966 | Holden et al. | 260/876 |
| 3,333,517 | 8/1967 | Kohler | 94/22 |
| 3,345,316 | 10/1967 | Nielsen | 260/28.5 |
| 3,440,195 | 4/1969 | Norcross | 260/28.5 |
| 3,707,901 | 1/1973 | Bynum et al. | 94/9 |
| 3,741,856 | 6/1973 | Hurst | 161/88 |
| 3,844,668 | 10/1974 | Winters et al. | 404/72 |
| 3,856,732 | 12/1974 | Bresson et al. | 260/28.5 |
| 3,869,417 | 3/1975 | Ramsay | 260/28.5 |
| 3,891,585 | 6/1975 | McDonald | 260/28.5 |
| 3,900,102 | 8/1975 | Hurst | 206/411 |
| 3,930,100 | 12/1975 | McDonald | 428/323 |
| 3,931,439 | 1/1976 | Bresson et al. | 428/265 |
| 3,978,014 | 8/1976 | van Beem et al. | 260/28.5 |
| 4,021,393 | 5/1977 | McDonald | 260/28.5 |
| 4,032,491 | 6/1977 | Schoenke | 260/28.5 |
| 4,068,023 | 1/1978 | Nielsen et al. | 427/138 |
| 4,069,182 | 1/1978 | McDonald | 260/28.5 |
| 4,115,335 | 9/1978 | Reusser et al. | 260/28.5 |
| 4,175,978 | 11/1979 | Marzocchi | 106/278 |
| 4,196,115 | 4/1980 | Bresson | 260/28.5 |
| 4,201,812 | 5/1980 | Blanken et al. | 428/95 |
| 4,278,724 | 7/1981 | Desgouilles | 428/193 |
| 4,282,127 | 8/1981 | Desgouilles | 260/28.5 |
| 4,332,703 | 6/1982 | Lijzenga et al. | 524/68 |
| 4,358,554 | 11/1982 | Yan et al. | 524/69 |
| 4,362,780 | 12/1982 | Marzocchi et al. | 428/489 |
| 4,381,357 | 4/1983 | Von Der Wettern et al. | 524/68 |
| 4,405,680 | 9/1983 | Hansen | 428/285 |
| 4,430,465 | 2/1984 | Abbott | 524/64 |
| 4,436,864 | 3/1984 | Grossi et al. | 524/458 |
| 4,440,816 | 4/1984 | Uffner | 428/40 |
| 4,464,427 | 8/1984 | Barlow | 428/40 |
| 4,468,430 | 8/1984 | Ruede | 428/489 |
| 4,485,144 | 11/1984 | Uffner et al. | 428/343 |
| 4,485,201 | 11/1984 | Davis | 524/68 |
| 4,508,770 | 4/1985 | Muncaster et al. | 428/63 |
| 4,529,625 | 7/1985 | Reidenbach et al. | 428/489 |
| 4,537,921 | 8/1985 | Uffner et al. | 428/489 |
| 4,545,699 | 10/1985 | Uffner et al. | 428/63 |
| 4,559,267 | 12/1985 | Freshwater et al. | 428/352 |

OTHER PUBLICATIONS

W. R. Grace Brochure, "Heavy Duty Bituthene".
Phillips Fibers Brochure, "The Petromat System".
Logan-Long Co. Brochure, "PrePave".
Hercules Inc. Brochure, "Polypropylene Fibers for Highway Paving Applications".
Owens-Corning Fiberglas Brochure, "Roadglas Spot Repair System".
Research Disclosure Publication #19821, Oct. 1980.
Research Disclosure Publication #19530, Jul. 1980.
Research Disclosure Publication #22803, Apr. 1984.
Research Disclosure Publication #19531, Jul. 1980.

Primary Examiner—Herbert J. Lilling
Attorney, Agent, or Firm—Ronald C. Hudgens; Robert F. Rywalski; Hiram P. Settle

[57] ABSTRACT

A membrane for the repair of road surfaces, particularly for the retardation of reflective cracking from an old road surface to a newly-applied overlay. The membrane comprises a glass fiber mat impregnated with a blend of asphalt, a block copolymer and a mineral filler. The membrane, in the form of a complete covering or relatively small patches applied directly over a crack, is thermally adhered to the old road and to the overlay by the heat of the overlay itself. The membrane has a low modulus of elasticity, particularly at below freezing temperatures, to minimize crack-propagating stresses and to distribute both thermal and traffic stresses over a broader area of both the old road surface and the overlay.

4 Claims, 3 Drawing Figures

ROAD REPAIR MEMBRANE

DESCRIPTION

Technical Field

The present invention relates to a membrane for the repair of road surfaces. The membrane retards reflective crackingg from the old road surface to a newly-applied overlay.

Background of the Invention

Failures in asphalt concrete pavements can result from instability, disintegration of the material, and cracking. Generally, instability and disintegration are results of faulty mix design and/or faulty construction procedures. Cracking, on the other hand, results primarily from thermal and traffic stresses which exceed the breaking strength of the asphaltic material.

Generally, thermal stresses are generated by changes in atmospheric temperatures which can cause rapid changes in temperature throughout the thickness of the pavement. Such rapid temperature changes, coupled with the fact that the pavement is insufficiently restrained from freely contracting or expanding, results in stressing of the pavement. These stresses may accumulate to the extent that the strength of the material is exceeded, at which time visible cracking may form. The maximum stress due to temperature change may be reached over several hours. For example, when a road cools rapidly at night—on the order of 6° F. per hour—the thermal stress in the road can increase from about 10 pounds per square inch at freezing (33° F.) to a value of about 220 pounds per square inch at −18° F.

The additional stressing of the road caused by traffic loading also causes the raod to deteriorate. However, in the case of traffic loading, stressing of the pavement occurs at a much faster rate, typically in seconds.

In the repair of deteriorated asphalt concrete roads, one of the most persistent and troublesome problems is the phenomenon of "reflective cracking." This occurs where a new asphalt concrete surface or "overlay" is applied to an old, cracked road surface. After a relatively short period of time, the cracks from the old raod will appear in the overlay above the location of the old cracks. This is known as "reflective cracking," and it occurs because the old cracks propagate by widening or lengthening with sufficient force to tear the new overlay.

Merely increasing the overlay thickness does not reduce the overall strain energy release rate or "stress intensity factor" and, thus, does not prevent reflective cracking. For example, increasing the overlay thickness from 1 inch to 3 inches may reduce the thermal stress intensity factor by about 17%, but it may increase the traffic stress intensity factor by as much as 50%. Thus, increasing the overlay thickness appears to be relatively immaterial so far as thermal stress is concerned, and the thickness increase actually may be counterproductive in reducing traffic stress.

It has been found that reflective cracking is due primarily to these same thermal and traffic stresses which occur in the asphalt road, particularly those thermal stresses which are generated by the road cooling quickly. Where the thermally stressed road is also subject to traffic loads, crack propagation and reflective cracking is greatly increased, with the resultant rapid deterioration of the newly-applied overlay. Also, any intrusion of water through the reflective cracks will cause further deterioration of the entire road.

BRIEF SUMMARY OF THE PRESENT INVENTION

The present invention now proposes the utilization of a membrane which is interposed between the old, cracked road surface and the newly-applied overlay to prevent or retard reflective cracking and to provide a barrier to water intrusion. This membrane may be applied as a series of relatively narrow, marginally overlapping strips covering the entire surface of the distressed road. Alternatively, the membrane of the present invention may be applied as a relatively small patch directly over a crack and extending longitudinally and laterally beyond the confines of the crack. In either case, the membrane is thermally adhered to both the old road surface and to the overlay by the heat of the overlay as it is applied.

It is critical that the membrane have a low modulus of elasticity at cold temperatures, typically ranging from freezing temperatures (33° F.) to −30° F., in order to significantly reduce the occurrence of reflective cracking, to provide a waterproofing layer, to minimize the stresses tending to propagate the crack and to materially increase the road life by distributing the thermal and traffic stresses tending to propagate a crack over a broader area of both the old road and the newly-applied overlay.

It has been found that the requisite low modulus characteristics can be developed by a membrane including a binder which contains asphalt modified by a minor amount of a block copolymer, preferably a styrene-butadiene-styrene linear block copolymer, the membrane being integrated into a sustainable distinct layer by the incorporation of a glass fiber mat. To give the requisite thickness to the membrane at minimal cost, a bulk filler, such as calcium carbonate, can be added. The membrane thickness is on the order of 0.025 to 0.075 inch, and the membrane can be manufactured as a continuous strip which is cut into easily-managed lengths, rolled and then packaged. The rolled strips can be cut into smaller patches, if desired or necessary.

It has been found that the membrane thickness does not materially affect the reduction of the stress intensity factor tending to propagate cracks into the overlay by reflective cracking, but the modulus of elasticity of the membrane has a great effect.

In comparative laboratory testing, utilizing a road overlay test apparatus, it has been found that an overlay of 2 inches applied over an old cracked surface will fail due to reflective cracking after about 150 cycles during the application of simulated traffic and thermal loads at a temperature of 0° F. The same testing showed that a 0.050 inch membrane of the present invention interposed between the composite old cracked surface and the 2-inch overlay resulted in a structure which survived 150,000 cycles without failure, also at 0° F. These simulated laboratory tests have been confirmed by actual field trials.

The membrane of the present invention comprises a glass fiber mat coated with a binder comprising a blend of asphalt with from 10 to 20% by weight (based on the combined weight of asphalt and elastomer) of an elastomer which preferably is a substantially linear A-B-A block copolymer, preferably such a copolymer wherein the A component is styrene and the B component is butadiene. Up to 60% by weight of an inert powdered mineral filler, such as whiting or calcium carbonate can be added. The membrane is relatively thin—on the order of 0.025 to 0.050 inch in thickness—and the binder has a softening point of less than about 300° F. and a penetration of less than about 50. The binder has a modulus of elasticity at reduced temperatures which is far less than that of the asphalt concrete layers between which it is sandwiched. The membrane is temporarily attached to the distressed, cracked old road surface by means of a tack coating, preferably an asphalt of AC-20 through AC-40 grade, and the subsequent application of the overlay heats the membrane sufficiently to adhere it firmly and permanently in place to both the underlying old road surface and the overlying overlay.

DETAILED DESCRIPTION OF THE PRESENT INVENTION

The membrane binder of the present invention has the following general formulations, by weight:

| | | |
|---|---|---|
| Asphalt | 40-85% | |
| Elastomer | 6-15% | |
| Mineral Filler | 55-0% | |

Preferably, the binder contains about 43% asphalt, about 7% elastomer and about 50% calcium carbonate.

The asphalt preferably is a high oil content asphalt having a softening point of from about 90° F. to about 120° F., a penetration of about 250-325, and a viscosity at 200° F. of from about 650 to about 750 cps and at 260° F. of from about 100 to about 140.

The presently preferred asphalt is identified as OCF Trumbull high oil content flux, Specification No. DT-2522, having the following properties:

| | |
|---|---|
| Softening Point | 100° F. |
| Penetration | 250-300 |
| Viscosity (cps) at 200° F. | 750 |
| Viscosity (cps) at 260° F. | 134 |
| Asphaltene Content | 8-14% |
| Paraffine Content | Less than 35% |
| Maltene Content | Balance |

The block copolymers employed in the present composition are thermoplastic elastomers and have at least two monoalkenyl arene polymer end blocks A and at least one elastomeric conjugated diene polymer midblock B. The number of blocks in the block copolymer is not of special importance and the macromolecular configuration may be linear, graft, radial or star depending upon the method by which the block copolymer is formed. Typical block copolymers of the most simple configuration would have the structure polystyrene-polyisoprene-polystyrene and polystyrene-polybutadiene-polystyrene. Other useful monoalkenyl arenes from which the thermoplastic (non-elastomeric) blocks may be formed include alphamethyl styrene, tert-butyl styrene and other ring alkylated styrenes as well as mixtures of the same. The conjugated diene monomer preferably has 4 to 5 carbon atoms, such as butadiene and isoprene. A much preferred conjugated diene is butadiene.

The average molecular weights of each of the blocks may be varied as desired. The monoalkenyl arene polymer blocks preferably have average molecular weights between about 5,000 and 125,000, more preferably between about 7,000 and about 50,000. The elastomeric conjugated diene polymer blocks preferably have average molecular weights between about 15,000 and about 250,000, more preferably between about 25,000 and 150,000. The average molecular weights of the polystyrene end blocks are determined by gel permeation chromotography, whereas the polystyrene content of the polymer is measured by infrared spectroscopy of the finished block polymer. The weight percentage of the thermoplastic monoalkenyl arene blocks in the finished block polymer should be between about 8 and 65%, preferably between about 10% and about 30% by weight.

The general type and preparation of these block copolymers are described in U.S. Pat. No. Re. 28,236 and in many other U.S. and foreign patents, e.g., U.S. Pat. Nos. 3,265,765; 3,281,383 and 3,639,521.

The presently preferred elastomer is an A-B-A linear block copolymer of a monovinyl aromatic hydrocarbon and a conjugated diene. Those polymers in which the A end blocks are styrene and the B midblocks are butadiene are preferred for the present invention. Suitable materials are commercially available under the trade names "Kraton" and "Finaprene".

Kraton 1101 is exemplary of suitable polymers for use in the present invention. Kraton 1101 is a linear styrene-butadiene-styrene block copolymer containing 30% styrene and 70% butadiene.

Kraton 1101 has the following characteristics:

| | |
|---|---|
| % Styrene | 30 |
| % (wt.) Oil Content | 0 |
| Solution Viscosity (CPS) (Brookfield; 25% in toluene at 77° F.) | 4,000 |
| Melt Index (G) | <1 |
| Molecular Weight | Medium |
| Tensile Strength (Solution Cast Film) | 4,600 |
| 300% Modulus (psi) | 400 |
| Elongation (%) | 880 |
| Set at Break (%) | 10 |
| Shore A Hardness | 71 |
| Specific Gravity | 0.94 |
| Physical Form | Crumb or Ground Crumb |

The filler is a mineral powder, such as calcium carbonate, slate dust, or the like. Preferably, a calcium carbonate of nominal 325 mesh size is utilized.

The glass fiber mat preferably is a non-woven roving mat, e.g., a modified wet process mat, such as that used in shingles. Continuous-strand mats or other unidirectional mats or woven mats of glass fibers may be also utilized. Such mats are commercially available from Owens-Corning Fiberglass Corporation.

The binder is prepared by heating the asphalt to a temperature of from about 350° F. to about 400° F. in a heated blending tank, adding the elastomer with the aid of a high shear mixer, and continuously blending the asphalt and elastomer for a period of from ½ hour to 1½ hours while slow-mixing the blend. The resultant blend is added to the pre-heated filler and coated on the glass fiber mat at a temperature of about 400° F.

The final product is a membrane which preferably is from about 25 mils (0.025 inch) to about 75 mils (0.075 inch) thick. The binder, i.e., the blended asphalt, elastomer and filler, has a softening point of less than 300° F., preferably from about 200° F. to about 250° F., and has a penetration value ranging from about 25 to about 30.

The binder has a tensile modulus of elasticity (in pounds per square inch) at a strain rate of 2 inches per minute (to simulate a traffic load), less than about the following amounts at the indicated temperature:

| Temperature | Maximum Modulus (psi) | |
|---|---|---|
| | Broad Range | Preferred Range |
| 30° F. | 10,000 | 6,000 |
| 10° F. | 50,000 | 30,000 |
| 0° F. | 80,000 | 60,000 |
| −10° F. | 150,000 | 120,000 |
| −20° F. | 300,000 | 175,000 |

Hereafter, the term "simulated traffic load" refers to this testing technique and the results thereof.

The modulus of elasticity of the binder at a thermal loading rate of 6° F. per hour is less than that indicated below:

| Temperature | Maximum Modulus (psi) | |
|---|---|---|
| | Broad Range | Preferred Range |
| 30° F. | 1,000 | 500 |
| 20° F. | 3,000 | 2,000 |
| 10° F. | 5,000 | 3,000 |
| 0° F. | 10,000 | 6,000 |
| −10° F. | 20,000 | 10,000 |
| −20° F. | 30,000 | 20,000 |
| −30° F. | 40,000 | 25,000 |

Figure 1:
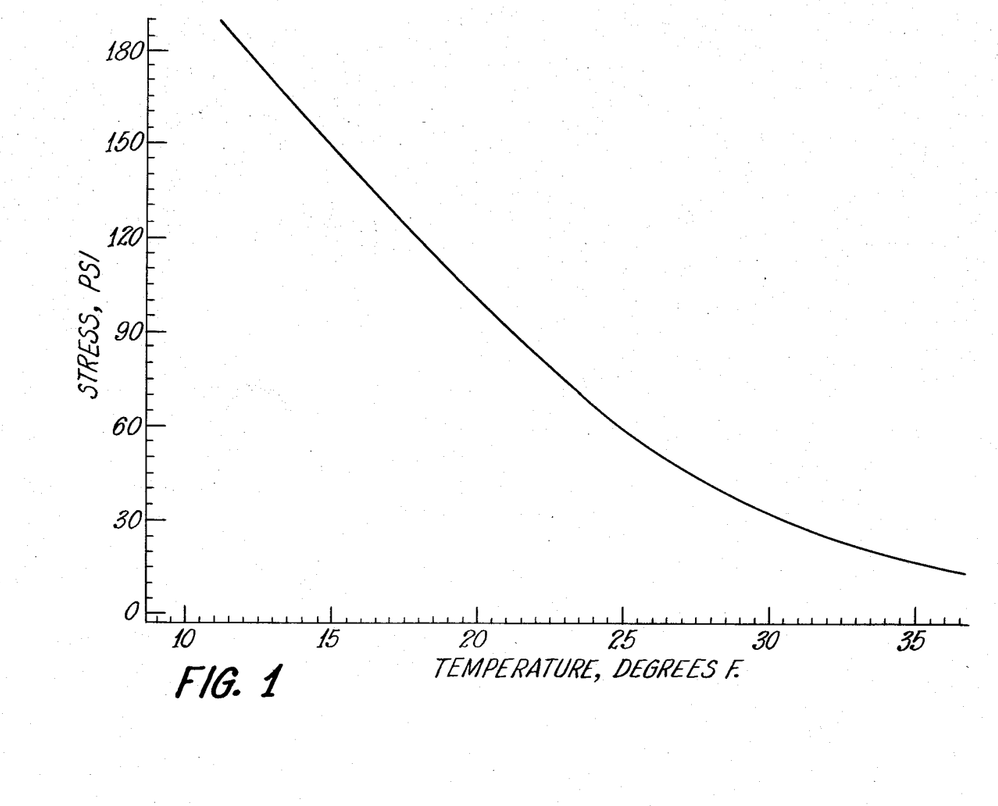
FIG. 1 is a graphic representation of the stresses generated in asphaltic concrete pavement upon a defined temperature reduction.
Figure 2:
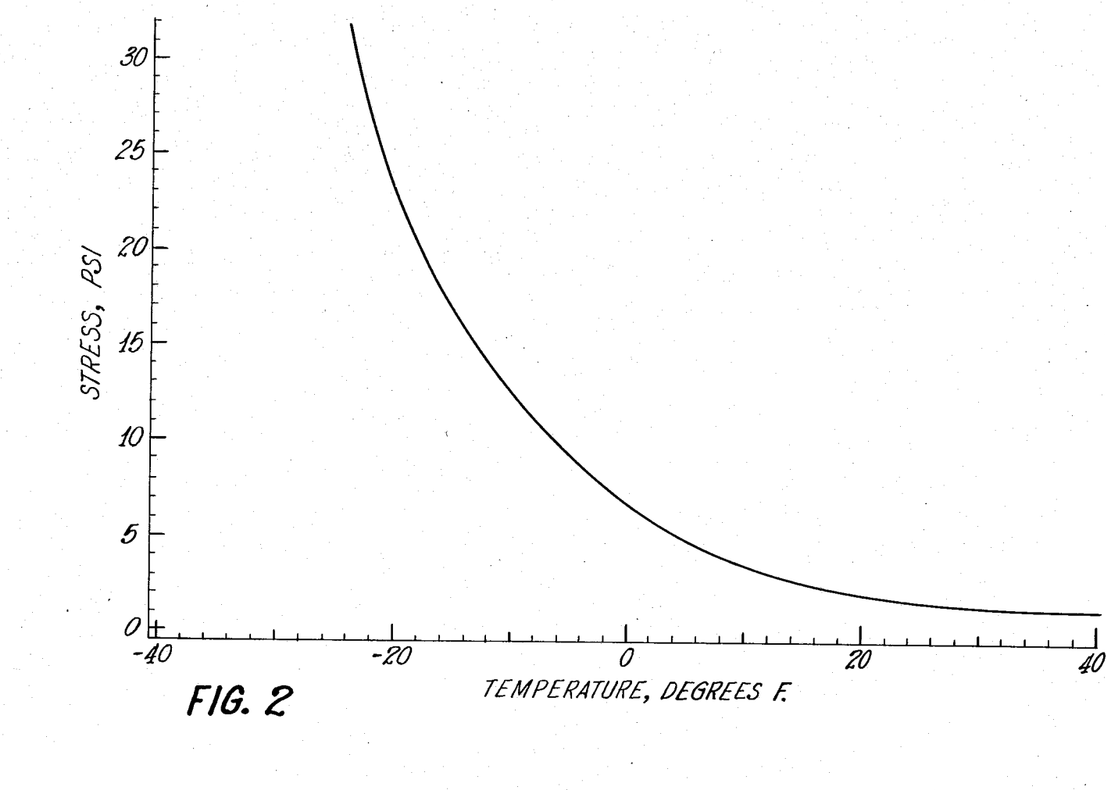
FIG. 2 is a graph similar to FIG. 1, illustrating the stresses generated in a membrane binder of the present invention.

The importance of the low modulus of elasticity at extremely low temperatures is indicated in the graphs of FIGS. 1 and 2. Further, the low modulus both under simulated traffic loading and thermal loading at temperatures of 0° F. and lower are critical to the prevention of reflective cracking by the use of the membrane of the present invention.

FIG. 1 is a graph in which the stress in a conventional asphalt concrete road is plotted against the temperature to which the road is subjected. The rapid increase in the stress with decreasing temperature can be readily ascertained.

FIG. 2 is a graph in which the stress in a binder formulation of the present invention, prepared as in Example I, is plotted against temperature. The far lower stresses in the binder of this invention can be seen. The membrane of this invention, when applied intermediate the old distressed road surface and a newly-applied overlay, acts to isolate the overlay from the lower old distressed road surface. Thus, the crack propagation stresses in the old crack are spread by the low-modulus membrane, and reflective cracking either will not occur or will be minimized.

The stress values of FIGS. 1 and 2 were determined by placing test samples prepared as in Example I in a temperature controlled chamber in which the samples were gripped rigidly at the ends. The air temperature in the chamber was lowered from 35° F. to −25° F. at a constant rate of 6° F. per hour. The test samples were prevented from expanding or contracting as the temperature was lowered, so that they were subject to zero strain. The sample temperature was determined by a thermocouple embedded in an identical sample placed close to the test sample. The samples measured 0.25×1.0×12 inches. As the temperature was lowered, the load and the stress in the samples were measured and recorded. A similar test procedure was reported in C. L. Monismith, G. A. Secor and K. E. Secor, Temperature Induced Stress and Deformations in Asphalt Concrete, *Proceeding of the Association of Asphaltic Paving Technologies*, Vol. 34, 1965.

These test procedures are found to be appropriate for determining the stress properties of asphaltic material under thermal loading. The procedure allows determination of these properties based on actual stressing of the samples by inducing temperature changes at rates that closely simulate climatic conditions. There is, however, no direct way of measuring modulus (which is the main property of interest) with this approach. Since the stress and coefficient of thermal expansion can be measured directly at different temperatures, the modulus can then be computed using classical relationships between thermal stress, modulus, coefficient of thermal expansion and the change in temperature by the equation:

$$\Sigma = E \cdot \alpha \cdot \Delta T$$

where:
$\Sigma$ = Thermal Stress
E = Modulus of Elasticity
$\alpha$ = Coefficient of Thermal Expansion
$\Delta T$ = Change in Temperature
The modulus may be expressed as $$E = \frac{\Sigma}{\alpha \cdot \Delta T}$$

This equation gives a relationship between modulus and stress at a single point on the temperature versus stress curve. In the case where the slope of the stress versus temperature plot changes with temperature, the following relationship is used to compute modulus:

$$\Sigma_i = \Sigma_{(i-1)} + E_i \alpha \Delta T$$

where $\Delta T = T_i - T_{(i-)}$. The subscript (i) denotes values of stress and modulus at the current temperature.

The modulus at a specific temperature is:

$$E = \frac{E_i - E_{(i-1)}}{\alpha \cdot \Delta T}$$

The above equation does not take into account the viscoelastic (time dependency) characteristics of the asphaltic materials. It also assumes that the coefficient of thermal expansion remains constant within the range of temperatures considered. Even with these simplifications, it is believed that properties generated with this test procedure allow a more accurate prediction of thermal stressing than the constant load rate approach. The computed moduli at different temperatures for the binder and asphaltic concrete are given in Tables (I) and (II).

Table I presents the tensile moduli for the membrane of Example I as determined at thermal loadings of 10° F.

per hour and 6° F. per hour, respectively, i.e., the temperature was reduced at a rate of either 10° F. or 6° F. per hour and the modulus was found to be:

TABLE I

| Temperature | 10°/Hour Modulus | 6°/Hour Modulus |
|---|---|---|
| 30° F. | 140 | 150 |
| 20° F. | 1,670 | 800 |
| 10° F. | 2,500 | 1,700 |
| 0° F. | 5,500 | 3,000 |
| −10° F. | 9,200 | 5,000 |
| −20° F. | 15,600 | 7,500 |
| −30° F. | 23,000 | 10,000 |

By contrast, Table II shows the tensile moduli for an asphaltic concrete which was thermally loaded at 10° F. per hour as in Table I:

TABLE II

| Temperature | Modulus |
|---|---|
| 30° F. | 55,560 |
| 20° F. | 122,220 |
| 10° F. | 166,670 |
| 0° F. | 188,890 |
| −2° F. | 222,220 |

In Table III, the stress values were determined by the method of ASTM Standard D-638-82. The values of Table III present the tensile moduli for the membrane binder of the present invention, prepared as in Example I, as determined at a simulated traffic loading of 2 inches per minute:

TABLE III

| Temperature | Modulus |
|---|---|
| 30° F. | 5,000 |
| 10° F. | 23,000 |
| 0° F. | 43,000 |
| −10° F. | 80,000 |
| −20° F. | 142,000 |

The stress necessary to propagate a crack can be mathematically expressed by Griffith's equation:

$$\sigma = \sqrt{\frac{4\phi E}{\pi l}},$$

where
$\sigma$ = Tensile stress required to cause a crack to propagate
$l$ = Initial crack size
$\theta$ = Thermodynamic surface free energy
$E$ = Young's modulus The expression $\sqrt{4\theta E}$ is the "stress intensity factor" of the "strain energy release factor" as hereinafter utilized in connection with the present invention. This factor represents the major force causing reflective cracking. The lower the factor, the less tendency there is a for reflective cracking.

Thus, if it were possible to reduce the "stress intensity factor," it would be possible to reduce the occurrence of reflective cracking in asphalt concrete roads.

Figure 3:
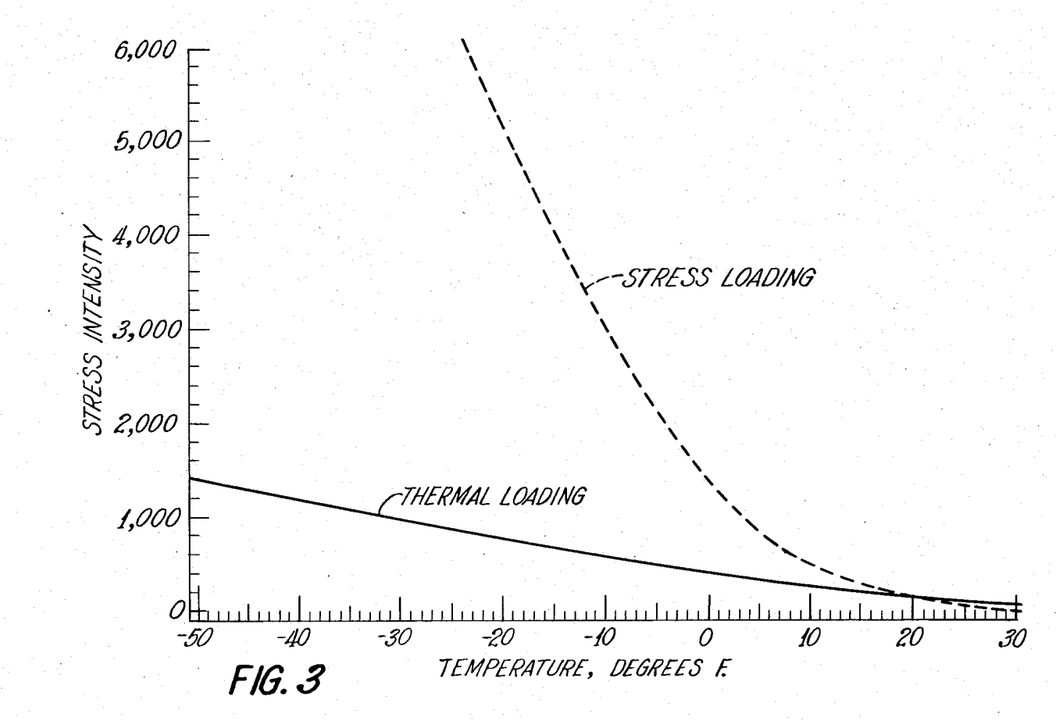
FIG. 3 is a graph derived by computer simulation and illustrating the stress intensity factor within an asphaltic concrete pavement provided with a membrane of the present invention.

FIG. 3 is a computer-generated graph, utilizing the modulus determinations of Tables I through III, and plotting the stress intensity factor against surface temperatures in an asphalt concrete pavement consisting of a 1-inch old road surface, a membrane prepared as set forth in Example I, and a 2-inch overlay placed on top of the membrane. The solid line represents the plot due to thermal loading at the rate of 6° F. temperature decrease per hour, the dotted line represents the simulated traffic loading at a strain rate of 2 inches per minute. Thus, the solid line represents the thermal load on the road, and the dotted line represents the traffic load.

Several membranes prepared as set forth in Example I were tested in a proprietary road overlay testing apparatus which is described and illustrated as Disclosure 24320 in *Research Disclosure,* July, 1984, published by Emsworth Studios, 535 West End Avenue, New York, New York 10024.

The membranes were each applied to a 1-inch simulated distressed road surface of asphalt concrete having a 0.125-inch crack therein, a membrane of the indicated thickness was tacked to the distressed road surface with AC-20 asphalt, and a 2-inch thick asphalt concrete overlay was then applied over and rolled onto the membrane as the crack was maintained in the simulated road surface. The composite was then subjected to simulated thermal and traffic load cycles as indicated in Table IV.

The test was then repeated with a second identical simulated distressed road surface and overlay, but without the membrane.

The following results were obtained:

TABLE IV

| | NUMBER OF CYCLES TO FAILURE | | | | | |
|---|---|---|---|---|---|---|
| | 73° F. | | | 0° F. | | |
| | X̄ | S | N | X̄ | S | N |
| CONTROL (No membrane) | 1,025 | 647 | 3 | 131 | 146.4 | 3 |
| MEMBRANE SAMPLES | | | | | | |
| 1. (0.050" thickness) | 5,138 | 3,462 | 2 | 128,638 | 31,037 | 2 |
| 2. (0.027" thickness) w/o sand | 2,980 | 848 | 2 | 165,250* | 7,162 | 4 |
| 3. (0.027" thickness) w/sand | | | | 190,320* | 36,181 | 3 |
| 4. (0.070" thickness) w/sand | 3,661 | 1,527 | 4 | 176,467* | 8,475 | 3 |

*Test terminated without failure
X̄ = Average number of cycles to failure
S = Standard Deviation (number of cycles)
N = Number of tests Membrane Sample 1 failed after 2 cycles at −15° F. No other tests were attempted at −15° F.

INDUSTRIAL APPLICABILITY

EXAMPLE I 43 parts by weight of the above-identified asphalt were loaded into a heated mixing tank equipped with a low-speed tank mixer and a high-shear blending mixer. The asphalt was heated to 350°–400° F., and 7 parts of the Kraton 1101 was added with both mixers operating. After an initial blending period of 15 minutes, the high-shear mixer was turned off, and the blend of asphalt and Kraton was heated and slow-mixed for a period of 1 hour to form a blend. The blend was transferred to a coating tank where 50 parts of CaCO₃ as above defined, preheated to 400° F., was then added to the blend and mixed uniformly therein. The resultant binder blend had the composition, by weight:

| Asphalt | 43.0% |
|---|---|
| Kraton 1101 | 7.0% |

-continued

| | |
|---|---|
| CaCO₃ | 50.0% |

The binder blend had a softening point of 248° F., a penetration of 26, and viscosities of 5125 cps at 350° F., of 3125 cps at 380° F., and of 2125 at 400° F.

The binder blend at about 400° F. was coated onto a continuous glass fiber mat, as above defined, by dipping the mat into the hot binder. The coated mat was then run through a set of pinch rolls to remove excess binder, and sand was sprinkled onto each surface of the coated mat to prevent blocking of the mat when rolled. The final membrane was 27 to 28 mils thick before the sand addition and, after the sand addition, was 38 to 40 mils thick. Membranes of various thicknesses were also prepared by the procedure of this Example I.

EXAMPLE II

A second membrane was prepared in the same manner as in Example I. The binder of this membrane had the composition, by weight:

| | |
|---|---|
| Asphalt | 63.2% |
| Kraton 1101 | 8.4% |
| CaCO₃ | 28.4% |

This binder was applied to a glass fiber mat as in Example I. The resultant membrane had properties similar to those of Example I.

To determine the efficiency of the membrane of the present invention under actual field conditions and in direct comparison with a control with no membrane and with a commercially available needle-punched, non-woven polypropylene membrane, four field installations were made, as follows:

EXAMPLE III

A field installation site was chosen on Franklin Street in Grand Rapids, Mich., a main city street carrying substantial truck and automobile traffic. The surface of the old bituminous concrete street had been milled or ground during partial removal of the previous surface.

Four consecutive test panels were prepared and applied to the old road surface, as follows:

Panel 1 was the CONTROL panel and received no treatment other than the application of a tack coat of 0.20 gallon per square yard of SS111, a slow setting aqueous asphalt emulsion.

Panel 2 was a membrane of the present invention and was applied on top of a tack coat of 0.25 gallon per square yard of molten AC-20. The membrane incorporated a continuous-strand mat of glass fibers.

Panel 3 was a membrane of the present invention and was applied to the same tack coat as used in Panel 2. The membrane incorporated a wet process mat of glass fibers.

Panel 4 was a competitive panel. An AC-20 tack coat of 0.25 gallon per square yard was applied hot and covered by a needle-punched, non-woven polypropylene fabric.

An overlay of bituminous concrete of a total thickness of 2½ inches was applied over all of the panels.

The installation was made on Sept. 30, 1983, and was inspected on May 8, 1984. The intervening climatological data for Grand Rapids, Mich. was as follows:

| | Temp. °F. | | No. Days When Temp. Was | | Total Accumulation of Snow |
|---|---|---|---|---|---|
| | High | Low | Below Freezing | Above Freezing | |
| Oct. | 67 | 26 | 3 | 2 | — |
| Nov. | 62 | 22 | 18 | 14 | 4.7" |
| Dec. | 39 | −18 | 29 | 2 | 34.8" |
| Jan. | 36 | −15 | 30 | 1 | 19.6" |
| Feb. | 63 | 9 | 28 | 1 | 1.6" |
| Mar. | 54 | 3 | 29 | 2 | 10.6" |
| | | Total: | 167 | 20 | 71.3" |

The comparison of original cracking and cracking 6½ months later, on May 8, 1984, is presented as follows:

| Panel No. | Installed Area (Feet) | Original Mapping 9/30/83 Avg. Crack Length in Ft/100 Lane Ft. | | | | Monitoring 5/8/84 | | | | | | |
|---|---|---|---|---|---|---|---|---|---|---|---|---|
| | | | | | | Avg. Crack Length/Ft/100 Lane Ft | | | | % Crack Return | | |
| | | Trans. | Long. | Diag. | Total | Trans. | Long. | Diag. | Total | Trans. | Long. | Total |
| 1 | 300 × 12 | 144 | 202 | 27 | 373 | 11 | 20 | — | 31 | 6.3 | 14 | 8.3 |
| 2 | 200 × 11 | 95 | 148 | 26 | 269 | 2 | 4 | — | 6 | 1.6 | 2.7 | 2.2 |
| 3 | 250 × 11.5 | 203 | 222 | 98 | 523 | 10 | 2 | — | 12 | 2.5 | 1.0 | 2.3 |
| 4 | 300 × 12 | 127 | 121 | 28 | 276 | 8 | 17 | — | 25 | 6.3 | 14 | 9.1 |

EXAMPLE IV

Four panels were treated on Route No. 2, a State Route near Plainfield, Vt. in the East Montpelier, Vt. area. Route No. 2 is a main road carrying heavy truck and automobile traffic.

The four panels were prepared as in Example III.

The installation was made on Oct. 6, 1983, and an overlay of from 1 to 1¼ inches of bituminous concrete was placed over all of the panels. The installations were monitored on Apr. 26, 1984. The climatological data for the intervening period in Plainfield, Vt. was:

| | Temp. °F. | | No. Days When Temp. Was | | Total Accumulation of Snow |
|---|---|---|---|---|---|
| | High | Low | Below Freezing | Above Freezing | |
| Nov. | 60 | 16 | 17 | 8 | 4.7" |
| Dec. | 51 | −11 | 27 | 4 | 14.4" |
| Jan. | 43 | −17 | 29 | 2 | 15.2" |
| Feb. | 56 | −10 | 21 | 8 | 13.7" |
| Mar. | 51 | −8 | 29 | 2 | 16.1" |
| | | | 123 | 24 | 64.1" |

The following table compares the extent of original cracking for each panel and the extent of cracking about 7 months:

| Panel No. | Installed Area (Feet) | Original Mapping 10/6/83 Avg. Crack Length in Ft/100 Lane Ft. | | | | Monitoring 4/26/84* | | | | | | |
|---|---|---|---|---|---|---|---|---|---|---|---|---|
| | | | | | | Avg. Crack Length/Ft/100 Lane Ft | | | | % Crack Return | | |
| | | Trans. | Long. | Diag. | Total | Trans. | Long. | Diag. | Total | Trans. | Long. | Total |
| 1 | 300 × 12 | 194 | 177 | — | 371 | 38 | 23 | 1.0 | 62 | 20 | 14 | 16.7 |
| 2 | 300 × 11.5 | 172 | 297 | — | 469 | 17 | 7 | — | 24 | 10 | 2.5 | 5.1 |
| 3 | 320 × 11.75 | 151 | 230 | 5 | 386 | 25 | — | — | 25 | 16.5 | — | 6.5 |
| 4 | 300 × 12 | 146 | 195 | 4 | 345 | 62 | 2 | — | 64 | 43 | 1 | 18.5 |

*Ambient Temperature - 43° F., Sunny

EXAMPLE V

Four panels, as described in Examples II and IV were installed on 25th Avenue, Columbus, Ohio on Oct. 27, 1983. 25th Avenue is not a major traffic artery and carries a low load of primarily automobile traffic.

The panel 2 was tack-coated with 0.4 gallon per square yard of AC-20, rather than with 0.25 gallon per square yard as in Examples III and IV.

The panels were covered with a 1¼ inch overlay of bituminous concrete, and the installation was inspected on May 22, 1984.

The intervening climatological data was as follows:

| Temp. °F. | | No. Days When Temp. Was | | Total Accumulation of Snow |
|---|---|---|---|---|
| High | Low | Below Freezing | Above Freezing | |
| Oct. 72 | 28 | 2 | 3 | — |
| Nov. 70 | 23 | 12 | 18 | 0.5" |
| Dec. 53 | −12 | 25 | 6 | 5.7" |
| Jan. 45 | −16 | 28 | 3 | 9.0" |
| Feb. 69 | 10 | 19 | 10 | 10.8" |
| Mar. 63 | −6 | 1 | 30 | 9.8" |
| Apr. 83 | 29 | 1 | 29 | 0.3" |
| May 86 | 35 | — | 22 | — |
| Total | | 88 | 121 | 36.1" |

Upon inspection seven months after installation, the following data was accumulated:

| Panel No. | Installed Area (Feet) | Orig. Mapping 8/24/83 Avg Crack Len/Ft/100 Lane Ft | | | | Bare Spots (Avg/100 Lane Ft) # Sq" Area | | Monitoring After 7 Mos. - 5/22/84* | | | | | | |
|---|---|---|---|---|---|---|---|---|---|---|---|---|---|---|
| | | | | | | | | Avg. Crack Length/Ft/100 Lane Ft | | | | % Crack Return | | |
| | | Trans. | Long. | Diag. | Total | | | Trans. | Long. | Diag. | Total | Trans. | Long. | Total |
| 1 | 63 × 12 | 328 | 300 | — | 628 | — | — | 1.1 | 3.7 | 0.17 | 5.0 | 0.3 | 1.25 | 0.8 |
| 2 | 304 × 11.6 | 310 | 354 | — | 664 | — | — | — | 20.6 | — | 20.6 | — | 5.8 | 3.1 |
| 3 | 288 × 11.4 | 270 | 288 | — | 558 | — | — | — | 0.7 | — | 0.7 | — | 0.2 | 0.1 |
| 4 | 300 × 12 | 264 | 313 | — | 577 | 3.7 | 439 | — | 3 | 0.7 | 3.7 | — | 1.0 | 0.6 |

*Ambient Temperature - 76° F., Sunny

EXAMPLE VI

Another installation of four panels was made at 19th Avenue, Columbus, Ohio during the week of Oct. 10, 1983. The panels were identical to those of Examples III and IV, except that panels 2, 3 and 4 were tacked with 0.30 gallons per square yard of AC-20. An overlay of 1¼ inch was applied to each panel. 19th Avenue is a deadened street with extremely low traffic. The climatological data for the relevant dates is presented in the following table:

| Temp. °F. | | No. Days When Temp. Was | | Total Accumulation Of Snow |
|---|---|---|---|---|
| High | Low | Below Freezing | Above Freezing | |
| Oct. 72 | 28 | 2 | 10 | — |
| Nov. 70 | 23 | 12 | 18 | 0.5" |
| Dec. 53 | −12 | 25 | 6 | 5.7" |
| Jan. 45 | −16 | 28 | 3 | 9.0" |
| Feb. 69 | 10 | 19 | 10 | 10.8" |
| Mar. 63 | −6 | 1 | 30 | 9.8" |
| Apr. 83 | 29 | 1 | 29 | 0.3" |
| May 86 | 35 | — | 22 | — |
| Total: | | 88 | 128 | 36.1" |

The installations were monitored on May 22, 1984 and the following results were obtained:

| Panel No. | Installed Area (Feet) | Original Mapping 8/24/84 Avg. Crack Length in Ft/100 Lane Ft. | | | | Monitoring 5/22/84* | | | | | | |
|---|---|---|---|---|---|---|---|---|---|---|---|---|
| | | | | | | Avg. Crack Length/Ft/100 Lane Ft | | | | % Crack Return | | |
| | | Trans. | Long. | Diag. | Total | Trans. | Long. | Diag. | Total | Trans. | Long. | Total |
| 1 | 390 | 239 | 301 | — | 540 | 0.61 | 0.43 | 0.35 | 1.40 | — | — | 0.26 |
| 2 | 285 × 11.7 | 140 | 207 | — | 347 | 0.35 | — | — | 0.35 | — | — | 0.10 |
| 3 | 312 × 11.6 | 191 | 264 | — | 455 | — | — | — | — | — | — | — |
| 4 | 300 × 12.5 | 274 | 372 | 1 | 647 | — | — | — | — | — | — | — |

*Ambient Temperature - 76° F., Sunny

The inconclusive results from Examples V and VI are attributed primarily to the low traffic density at the installations.

Having completely and fully described our invention, we now claim:

1. A membrane for installation upon an old cracked road surface to retard reflective cracking into a later-applied asphalt concrete overlay superimposed on the membrane, said membrane consisting essentially of a glass fiber mat having applied thereto, a binder consisting essentially of a blend of about 40-85% by weight unblown asphalt, about 6-15% by weight elastomer, and about 0-55% by weight mineral filler, the elastomer being a block copolymer having at least two monoalkenyl arene polymer end blocks and at least one elastomeric conjugated diene polymer midblock, and the maximum simulated traffic and thermal moduli of the binder do not exceed the following values:

| Temp. | |
|---|---|
| | Simulated Traffic Modulator at 2-Inch/Min. |
| 0° F. | 60,000 |
| −10° F. | 120,000 |
| −20° F. | 175,000 |
| | Thermal Modulus at 6° F. Reduction/Hour |
| 0° F. | 6,000 |
| −10° F. | 10,000 |
| −20° F. | 20,000 |
| −25° F. | 25,000 |

2. A membrane as defined in claim 1, wherein:
(a) the elastomer is a linear block copolymer of styrene and butadiene;
(b) the binder has a softening point of less than about 300° F. and a penetration value of from about 20 to about 30, and the membrane is from about 0.025 to about 0.075 inch thick; and
(c) the maximum traffic moduli of the binder do not exceed the following values:

| Temperature | Modulus (psi) |
|---|---|
| 30° F. | 6,000 |
| 10° F. | 30,000 |
| 0° F. | 60,000 |
| −10° F. | 120,000 |
| −20° F. | 175,000 |

(d) and the maximum thermal moduli of the binder do not exceed the following values:

| Temperature | Maximum Modulus (psi) |
|---|---|
| 30° F. | 500 |
| 20° F. | 2,000 |
| 10° F. | 3,000 |
| 0° F. | 6,000 |
| −10° F. | 10,000 |
| −20° F. | 20,000 |
| −30° F. | 25,000 |

3. The method of retarding reflective cracking from an old distressed and cracked road surface to a newly-applied overlay of asphalt concrete, the steps of (a) positioning a membrane on the old road surface to cover the distressed and cracked road surface, (b) covering the membrane with a hot-applied overlay of asphalt concrete, and (c) utilizing the heat of the overlay to thermally adhere the membrane to both the old road surface and the overlay, the membrane consisting essentially of a glass fiber mat having applied thereto a binder having a softening point of less than about 300° F. and consisting essentially of

| Asphalt | 40–85% by weight |
|---|---|
| Linear Block Copolymer of Styrene and Butadiene | 6–15% by weight |
| Mineral Filler | 0–55% by weight | the binder having a tensile modulus of elasticity (in psi) at a strain rate of 2 inches per minute, less than about the following amounts at the indicated temperature:

| Temperature | Maximum Modulus (psi) |
|---|---|
| 30° F. | 6,000 |
| 10° F. | 30,000 |
| 0° F. | 60,000 |
| −10° F. | 120,000 |
| −20° F. | 175,000 | the binder also having a modulus of elasticity at a thermal loading rate of 6° F. per hour less than about the following amounts at the indicated temperature:

| Temperature | Maximum Modulus (psi) |
|---|---|
| 30° F. | 500 |
| 20° F. | 2,000 |
| 10° F. | 3,000 |
| 0° F. | 6,000 |
| −10° F. | 10,000 |
| −20° F. | 20,000 |
| −30° F. | 25,000 | the membrane having a thickness of from about 0.025 to about 0.075 inch, the asphalt having sufficient aromaticity to dissolve the elastomer; applying a hot overlay of asphalt concrete directly onto the surface of the membrane; and thermally bonding the membrane both to the underlying old road surface and to the overlying overlay by the heat of the applied overlay.

4. The method of claim 3, wherein the binder consists essentially of about 43% by weight asphalt, about 7% by weight linear block copolymer, and about 50% by weight calcium carbonate.

* * * * *